(12) United States Patent
Gloeckler et al.

(10) Patent No.: US 9,216,715 B2
(45) Date of Patent: Dec. 22, 2015

(54) BELT RETRACTOR

(71) Applicant: Takata AG, Aschaffenburg (DE)

(72) Inventors: Oliver Gloeckler, Nersingen (DE);
Tobias Miller, Neu-Ulm (DE);
Christoph Pechhold, Erbach (DE)

(73) Assignee: TAKATA AG, Aschaffenburg (DE)

( * ) Notice: Subject to any disclaimer, the term of this patent is extended or adjusted under 35 U.S.C. 154(b) by 0 days.

(21) Appl. No.: 14/402,884

(22) PCT Filed: May 8, 2013

(86) PCT No.: PCT/DE2013/200013
§ 371 (c)(1),
(2) Date: Nov. 21, 2014

(87) PCT Pub. No.: WO2013/174375
PCT Pub. Date: Nov. 28, 2013

(65) Prior Publication Data
US 2015/0108266 A1 Apr. 23, 2015

(30) Foreign Application Priority Data
May 24, 2012 (DE) .......................... 10 2012 208 700

(51) Int. Cl.
*B60R 22/34* (2006.01)
*B60R 22/28* (2006.01)

(52) U.S. Cl.
CPC ....... *B60R 22/3413* (2013.01); *B60R 2022/286* (2013.01)

(58) Field of Classification Search
CPC .......................... B60R 22/28; B60R 2022/286
USPC ....................................... 242/379.1; 297/471
See application file for complete search history.

(56) References Cited

U.S. PATENT DOCUMENTS

| 5,618,006 A | 4/1997 | Sayles |
| 5,934,597 A | 8/1999 | Ludwig |
| 6,216,972 B1 | 4/2001 | Rohrle |
| 6,425,542 B2 | 7/2002 | Huber |

(Continued)

FOREIGN PATENT DOCUMENTS

| DE | 73 06 883 U | 2/1973 |
| DE | 85 15 327 | 9/1985 |
| DE | 100 15 048 C1 | 10/2001 |
| DE | 202 07 277 U1 | 9/2002 |

(Continued)

OTHER PUBLICATIONS

International Search Report and Written Opinion; PCT/DE2013/200013; issued Aug. 26, 2013; 9 pgs.

*Primary Examiner* — Sang Kim
(74) *Attorney, Agent, or Firm* — Gordon & Rees LLP

(57) ABSTRACT

The invention relates to a belt retractor (10) for a seatbelt, comprising a belt reel (20) for winding up and unwinding the seatbelt, and a lockable locking base (30) which is connected to the belt reel (20) and, before locking, is rotated together with the belt reel (20) and, after locking, the rotational movement of said locking base is blocked, wherein, in the event of locking of the locking base (30) for limiting the belt force, the locking base (30) and the belt reel (20) can rotate relative to each other. According to the invention, the belt retractor has a band (70) which, in the event of a relative rotation between belt reel and locking base, is pulled into a gap (110), said gap (110) being defined by at least one deformable element (150, 200) which is deformed by the band (70) pulled into the gap (110).

15 Claims, 16 Drawing Sheets

(56) References Cited

U.S. PATENT DOCUMENTS

Figure 1:
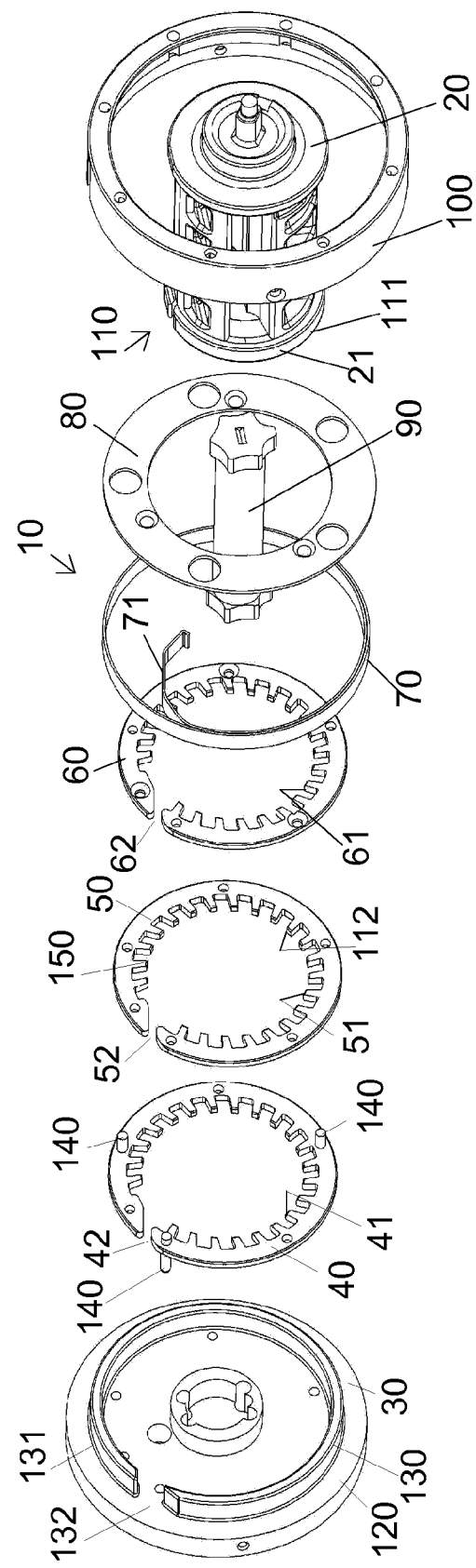

| | | |
|---|---|---|
| 6,926,221 B2 | 8/2005 | Rohrle et al. |
| 7,232,089 B2 * | 6/2007 | Inagawa et al. ............ 242/379.1 |
| 7,651,136 B2 | 1/2010 | Kielwein et al. |
| 2011/0057064 A1 | 3/2011 | Toth et al. |

FOREIGN PATENT DOCUMENTS

| | | |
|---|---|---|
| DE | 202 10 812 U1 | 1/2003 |
| DE | 10 2005 026 885 A1 | 12/2006 |
| DE | 10 2006 006 795 A1 | 8/2007 |
| EP | 1 110 827 A2 | 6/2001 |

* cited by examiner

BELT RETRACTOR

The invention relates to a belt retractor with the features according to the preamble of patent claim 1.

A belt retractor of this type is known from U.S. Pat. No. 6,216,972 B1. The previously known belt retractor has a belt reel for winding up and unwinding a seatbelt, and a lockable locking base which is connected to the belt reel and, before locking, is rotated together with the belt reel and, after locking, is blocked in its rotational movement. In the event of locking of the locking base, a relative rotation between locking base and belt reel is possible for the purpose of limiting the belt force; during said relative rotation, a metal band is guided through a chicane channel and repeatedly bent over in the process. The repeated bending over of the band causes energy to be consumed, and therefore the relative rotation between locking base and belt reel and, in association therewith, a further extension of the seatbelt are made more difficult and a belt restraining force is produced.

The invention is based on the object of specifying a belt retractor which has a compact construction and makes it possible to predetermine the belt restraining force in a specific manner within a wide range for the event of a relative rotation between belt reel and locking base.

This object is achieved according to the invention by a belt retractor with the features according to patent claim 1. Advantageous refinements of the belt retractor according to the invention are specified in dependent claims.

Provision is accordingly made, according to the invention, for the belt retractor to have a band which, in the event of a relative rotation between belt reel and locking base, is drawn into a gap, and for the edge of the gap to be bounded by at least one deformable element which is deformed by the band drawn into the gap.

A substantial advantage of the belt retractor according to the invention can be seen in the fact that, in the case of said belt retractor, it is not the deformation of the band which is used for producing a restraining force but, instead, the deformation of at least one deformable element which is deformed by the band drawn into the gap. By means of the dissipation of energy provided, according to the invention, by the deformable element and not by the band itself, the restraining force can be set in a very specific manner and the construction of the belt retractor can nevertheless be kept very compact. Thus, owing to the presence of the at least one deformable element, a multiplicity of setting parameters are namely available, said setting parameters being able to be used to influence the belt restraining force in the event of a relative rotation between belt retractor and locking base. For example, over which relative angle of rotation a restraining force should be produced by the band can be determined via the length of the band. The geometry and the material of the deformable element or elements and the gap width of the gap provide further setting options with which the characteristics of the belt band extension can be influenced in the event of a relative rotation between locking base and belt reel, or can be set in a specific manner in accordance with the respective requirements.

For example, with the belt retractor according to the invention, it can be determined in a very simple and therefore advantageous manner whether the angle of rotation between belt reel and locking base should be limited by the band: for example, it can be provided, according to a first advantageous variant, that, when the band is completely drawn into the gap, a further relative rotation between locking base and belt reel is blocked, for example with the aid of a stopping element which is arranged at one end of the band.

According to a second advantageous variant, it can be provided, for example, that the relative rotation between belt reel and locking base is ended by the fact that the gap, on the basis of the gap width from a predetermined maximum limiting angle of rotation between belt reel and locking base, no longer permits any further drawing-in of the band and the band is blocked or jammed in the gap.

According to a third advantageous variant, it can be provided, for example, that there is no limiting of the angle of rotation between belt reel and locking base and the band, after being completely drawn into the gap, for example merely continues to be rotated therewith.

It is considered to be particularly advantageous if a plurality of deformable elements are present; in such a case, the characteristics of the restraining force can additionally also be determined by the arrangement of the deformable elements with respect to one another.

The gap, the edge of which is bounded by the at least one deformable element, can already be present before the band is introduced or can have a gap width greater than zero before the band is drawn into the gap. Alternatively, the gap can also be formed only by the introduction of the band.

It is considered to be particularly advantageous if the gap is annular and is bounded by an outer annular gap wall and an inner annular gap wall. The shape of the annular gap is as desired here; the annular gap may be circular, oval or even polygonal. An annular gap permits repeated winding up of the band and therefore relative angles of rotation beyond 360°.

The gap is preferably bounded on one side by the locking base or by at least one element connected to the locking base for rotation therewith and on the other side by the belt reel or by at least one element connected to the belt reel for rotation therewith.

With regard to a minimum number of parts, it is considered to be advantageous if the inner annular gap wall is formed by an annular outer section of the belt reel.

With regard to a compact construction of the belt retractor, the gap and/or the annular gap walls of the gap are preferably arranged concentrically with respect to the axis of the belt retractor; alternatively, however, a non-concentric or an axially offset arrangement of the center of the annular gap relative to the axis of the belt retractor is also conceivable. In the event of an eccentric arrangement, the profile of the rise in force in the event of a relative rotation between belt reel and locking base can be set very simply.

With regard to the positioning of the at least one deformable element, it is considered to be advantageous if said element is formed on the outer annular gap wall or on the inner annular gap wall.

The outer gap wall of the gap may be formed, for example, by the annular inner wall of a single annular disc. However, it is considered to be particularly advantageous if the outer gap wall of the gap is formed by the annular inner walls of at least two annular disks which are arranged one behind another—as seen along the belt reel axis—and are in each case provided with a multiplicity of inwardly projecting, deformable elements. In this refinement, it is possible to achieve a desired force profile during the belt band extension in a particularly precise manner by a different selection of material and/or a different geometrical configuration of the deformable elements on the annular disks.

The inside diameter of the annular disk can vary over the circumference, for example by a size, which is variable over the circumference, of the inwardly projecting, deformable element; this permits, for example, a continuous or stepped rise in force in the event of a relative rotation between locking base and belt reel.

If the outer gap wall of the gap is formed by two or more annular disks, then it is provided, according to a particularly preferred refinement, that the inwardly projecting, deformable elements of at least two annular disks are arranged rotated with respect to one another in such a manner that the band, on introduction into the gap, runs in a time-staggered manner against the inwardly projecting, deformable elements of the at least two annular disks. A rotated arrangement of the deformable elements of the annular disks with respect to one another makes it possible, in a particularly simple manner, to set a continuous profile of the belt band extension force via the relative angle of rotation between locking base and belt reel, since sudden drops in force in the sections between successive deformable elements of an annular disk can be compensated for by offset, deformable elements of another annular disk.

With regard to a particularly continuous force profile, it is considered to be advantageous if the outer gap wall of the gap is formed by the annular inner walls of at least three annular disks which are arranged one behind another—as seen along the belt reel axis—and are in each case provided with a multiplicity of inwardly projecting, deformable elements, wherein the inwardly projecting, deformable elements of the annular disks are rotated with respect to one another and the band, on introduction into the gap, runs in a time-staggered manner against the inwardly projecting, deformable elements of the at least three annular disks.

The annular disks are preferably cast or punched parts. Said parts are preferably connected to the locking base or to the belt reel for rotation therewith, for example by attaching (for example with bolts), by screwing, by riveting, by adhesive bonding, by welding, by soldering, etc. In the event of such a configuration, the outer contour of the annular disks can form a support surface and therefore a bearing surface on which the band rests before the band is drawn into the gap.

Alternatively, the outer contour of the annular disk(s) can be adapted to the inner contour of a section of the locking base in such a manner that the annular disks form an interlocking connection, at least in sections, with the locking base; in this case, the annular disks can be plugged directly onto or into the locking base. A toothing is preferably provided on the outer contour of the annular disk(s), for example by means of a wavy shape, said toothing being matched to a corresponding toothing or wavy shape on the inner contour of a section of the locking base.

In the refinement last mentioned, it is considered to be advantageous if a separating ring is integrally formed as a single part on the locking base or is fitted thereon from the outside, the outer contour of which separating ring forms a support surface and therefore a bearing surface on which the band rests before said band is drawn into the gap. In this case, the inner contour of said separating ring can form the inner contour of that section of the locking base which forms the described interlocking connection with the annular disks.

Furthermore, with regard to simple installation, it is considered to be advantageous if the band is connected at one band end to the belt reel.

The other band end of the band can be provided, for example, with a stopping element in order to end a further relative rotation between the locking base and the belt reel when or before the band has been completely drawn into the gap.

Furthermore, with regard to a compact construction, it is considered to be advantageous if the belt retractor has an annular storage gap in which the band is stored in wound-up form before a relative rotation between belt reel and locking base and from which, in the event of a relative rotation between locking base and belt retractor, said band is drawn into the gap by the at least one deformable element—also called "deformable gap" in short below.

The annular storage gap and the deformable gap which is bounded by the at least one deformable element are particularly preferably arranged concentrically with respect to each other. Such a configuration makes it possible to draw the band from the annular storage gap into the deformable gap as soon as a relative rotation between the belt reel and the locking base occurs, without the band having to leave the cross-sectional plane of the annular storage gap.

With regard to the annular storage gap, it is also considered to be advantageous if the diameter of the annular storage gap is larger than the diameter of the annular deformable gap, which is bounded by the at least one deformable element, and the annular storage gap is arranged concentrically around the deformable gap.

For a simple threading of the band into the deformable gap, it is considered to be advantageous if the outer gap wall has a slot which permits the band to be drawn into the deformable gap from the outside. The longitudinal direction of the slot preferably extends parallel to the axis of the belt retractor.

The deformable elements can be formed, for example, by teeth which are formed on the outer annular gap wall and/or on the inner annular gap wall. The teeth are preferably oriented in the direction of the interior of the gap.

In addition or alternatively, it can be provided that the deformable element or the deformable elements are in each case formed by a section of the inner or outer annular gap wall, which section is oriented radially in the direction of the interior of the gap. The deformability of the sections is preferably ensured by in each case one or more holes or one or more bores. The holes or bores are preferably located on the inside, i.e. behind the respective gap wall, as viewed radially, and weaken said gap wall, and therefore the respective gap wall can bend as the band is rotated in.

If, for example, the outer gap wall of the gap is formed by the annular inner wall of an annular disk, the deformable elements can be formed by inwardly projecting, deformable sections of the annular inner wall of the annular disk, wherein holes or bores are present behind the respective sections, i.e. radially on the outside in the material of the annular disk. The holes or bores, which are preferably designed as passage holes, preferably extend parallel to the belt reel axis.

Alternatively, it can be provided that the deformable element or the deformable elements in each case comprise at least two supporting members which are connected to each other by a connecting section. The connecting section preferably forms a circular-arc-shaped section of the outer annular gap wall or of the inner annular gap wall. The configuration corresponds in terms of operation to the above-described embodiment, in which the annular inner wall of the annular disk is mechanically weakened by holes.

The supporting members are preferably oriented in the direction of the interior of the gap.

With regard to the material of the band, it is considered to be advantageous if said band is composed of steel, for example spring steel. The deformable elements are preferably composed of steel or aluminum.

Furthermore, it is considered to be advantageous if the band is hooked in at a hooking-in point in double-layered form in the belt reel and is drawn partially or continuously in double-layered form into the gap between locking base and belt reel. Double-layered hooking-in simplifies the installation.

In the event of a double-layered drawing of the band into the gap between locking base and belt reel, it is furthermore considered to be advantageous if the band is partially drawn in double-layered form and partially in single-layered form. The band is preferably drawn into the gap between belt reel and locking base in double-layered form by a front, double-layered band section and only in single-layered form by a rear single-layered band section which adjoins the front double-layered band section. In the event of such a configuration, the effect can advantageously be achieved that the frictional force, which the deformable elements still exert on the band because of elasticity possibly being present after bending away has been effected, plays a role in each case only—if at all—in the region of the front double-layered band section and is significantly lower or even completely negligible in the region of the single-layered band section.

The invention also relates to a method for mounting a belt retractor as has been described above. According to the invention, it is provided that, within the scope of the installation, the locking base is rotated relative to the locking base and the band is drawn into the gap until the torque required for the rotation has reached or exceeded a predetermined maximum value. As an alternative, within the scope of the installation, the locking base can be rotated relative to the locking base and the band can be drawn into the gap until a predetermined angle of rotation is reached.

Figure 2:
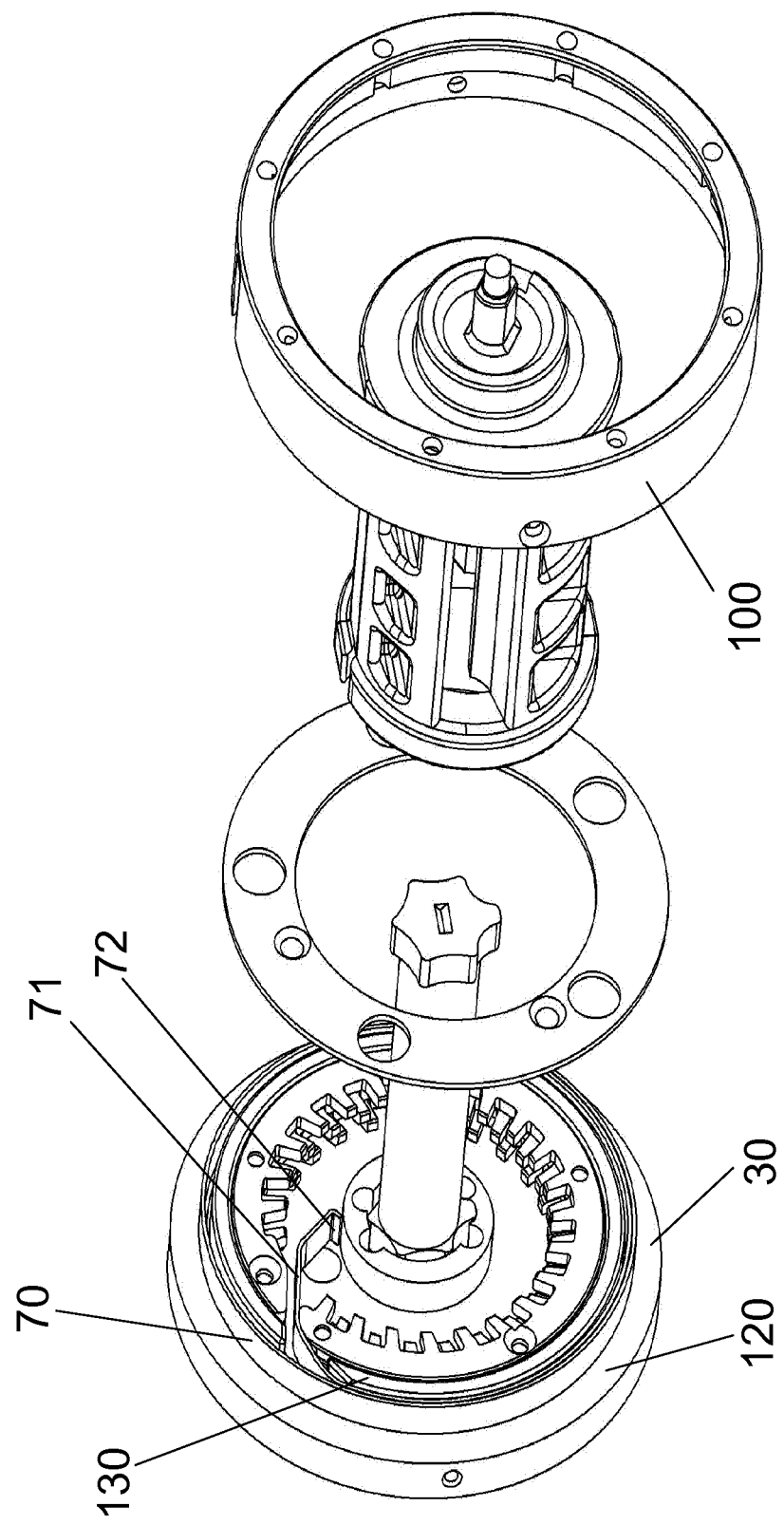
Figure 3:
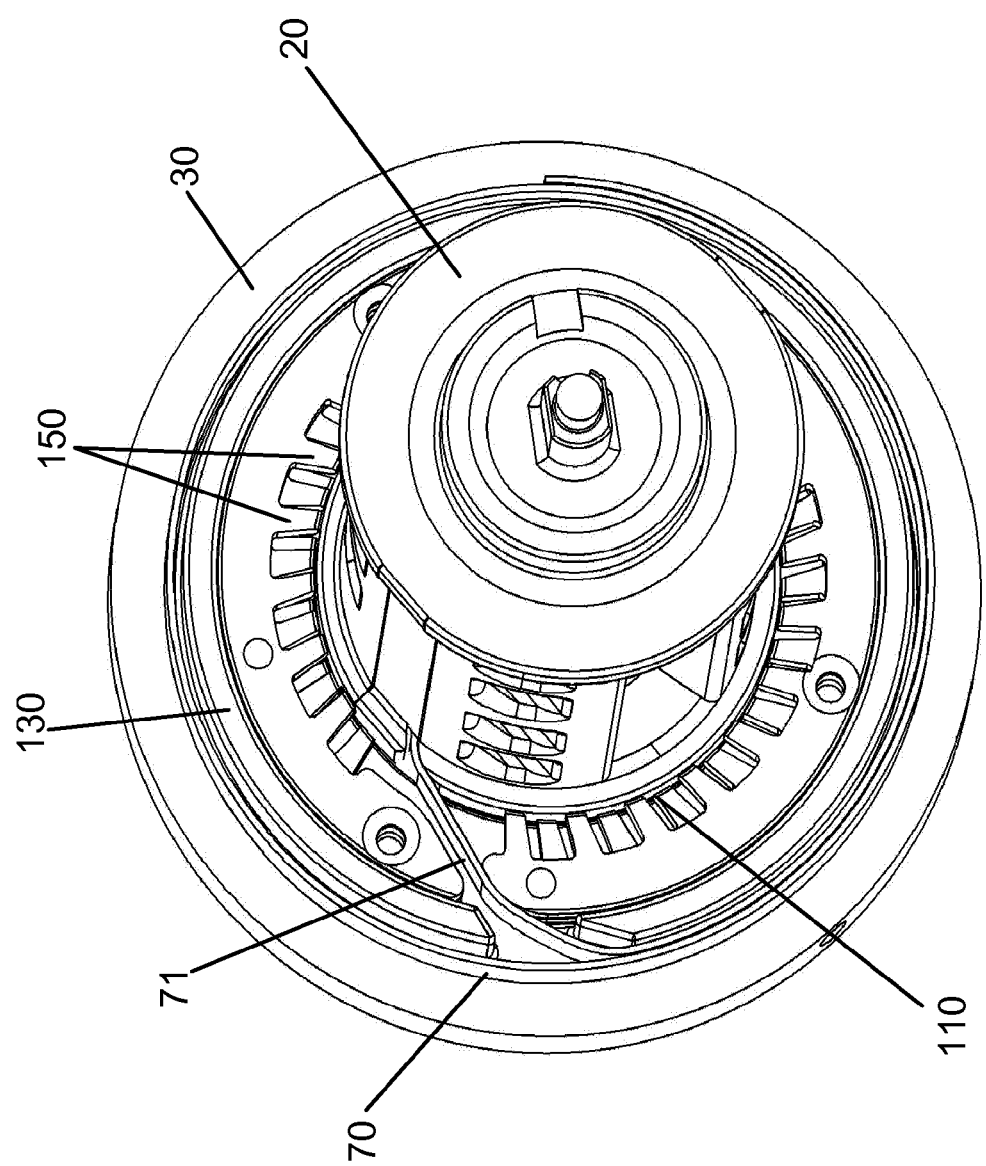
Figure 4:
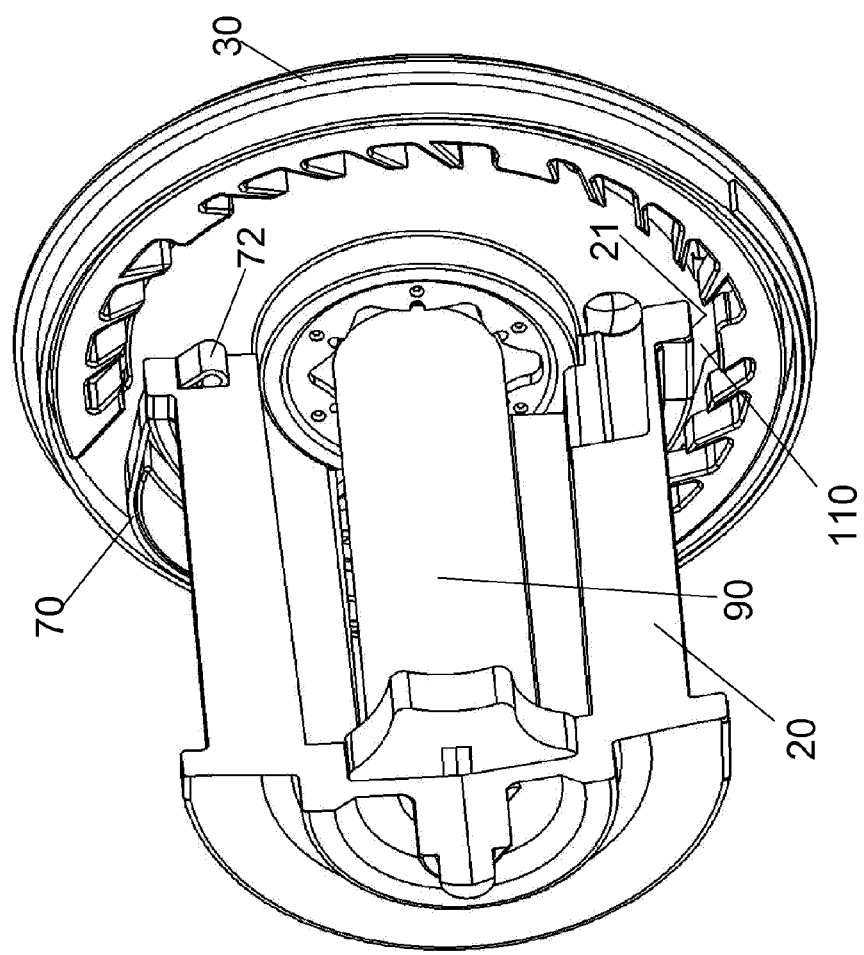
Figure 5:
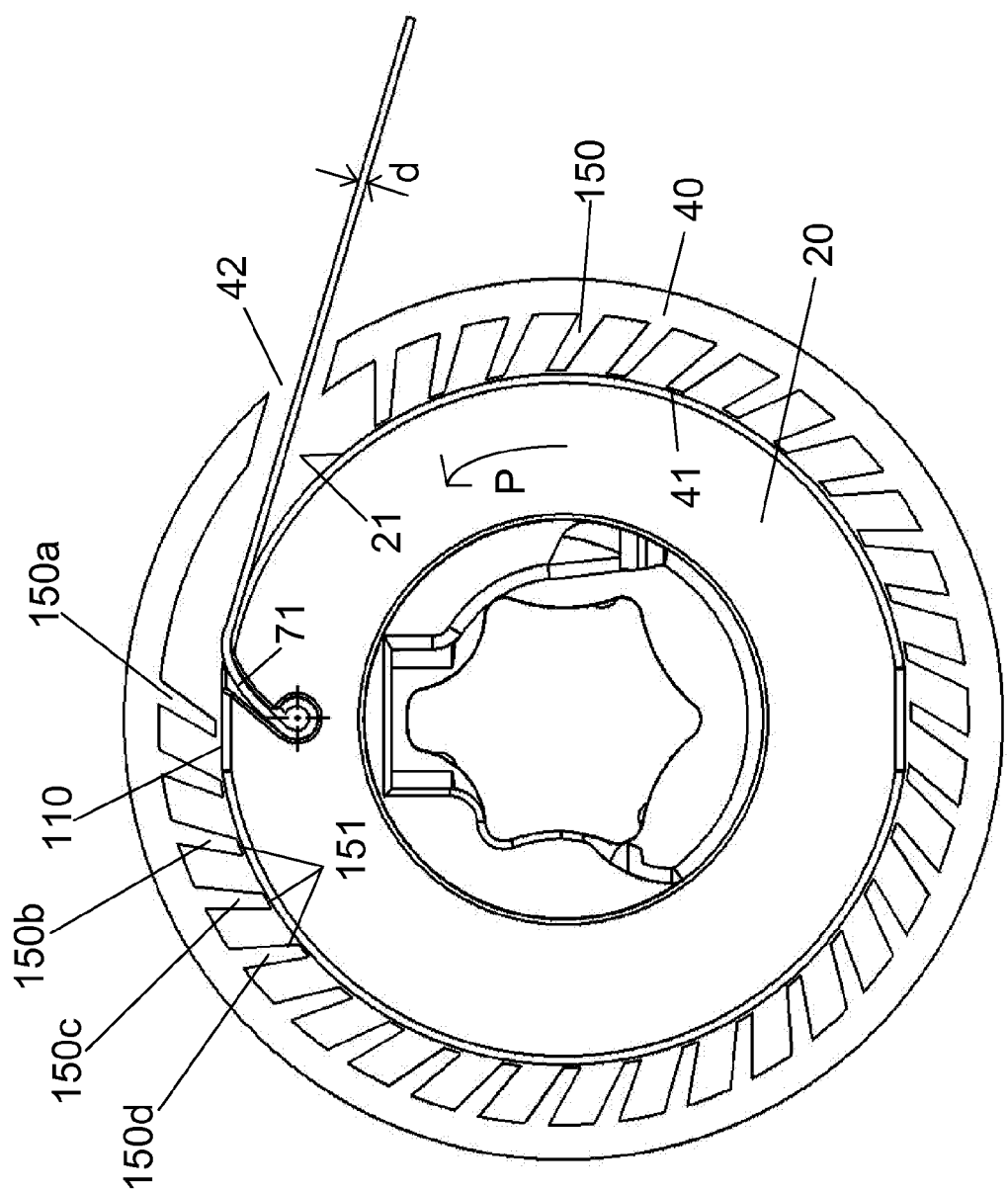
Figure 6:
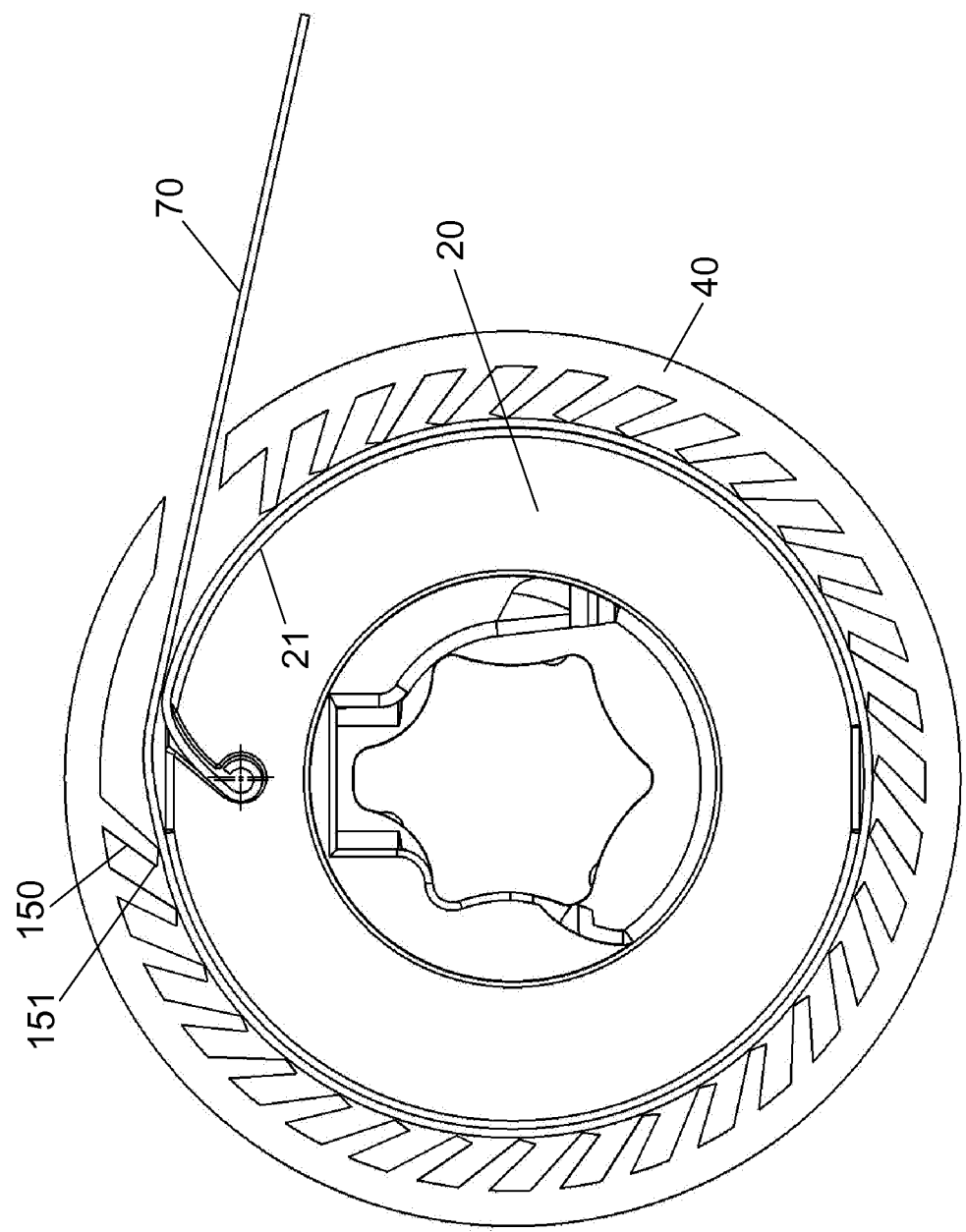
Figure 7:
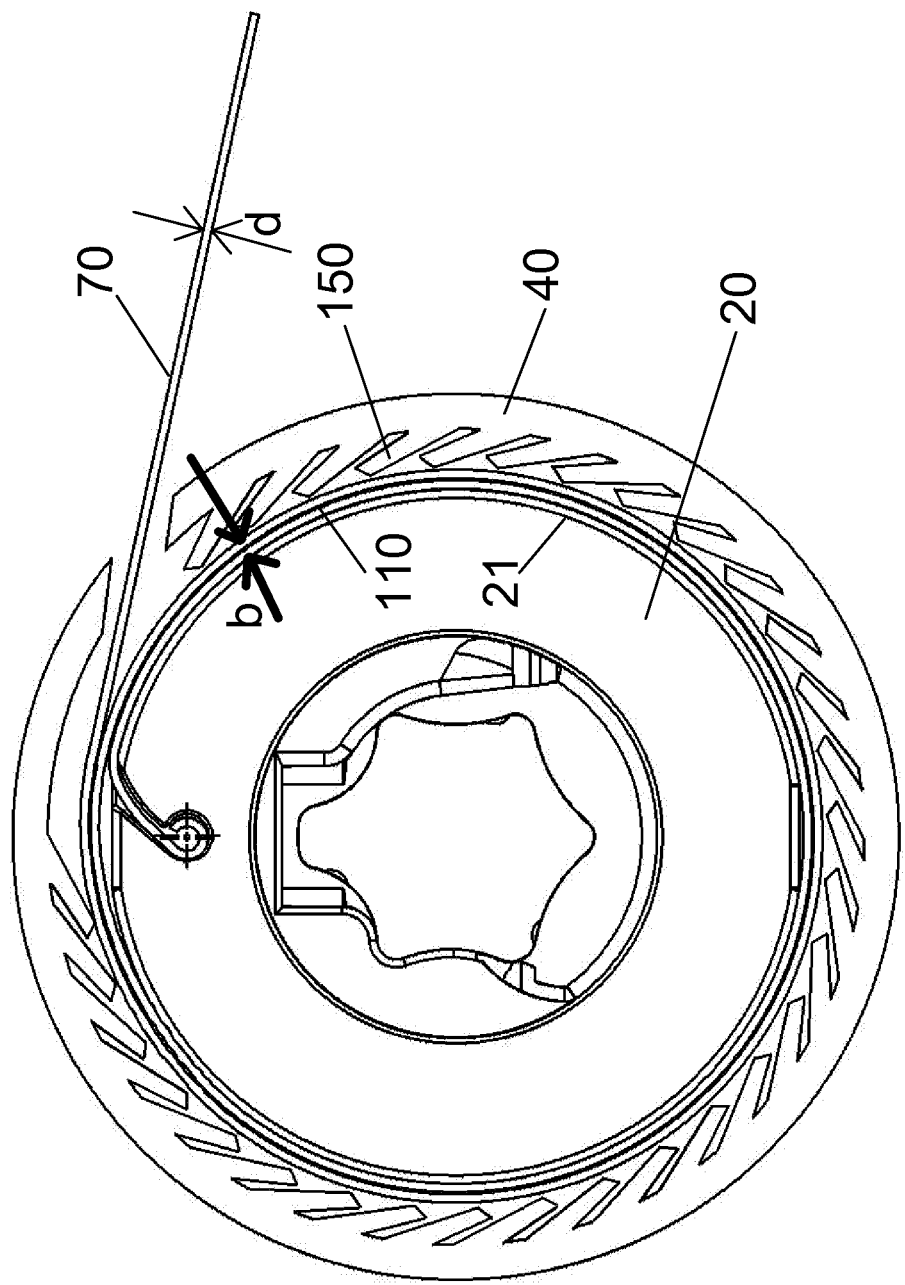
Figure 8:
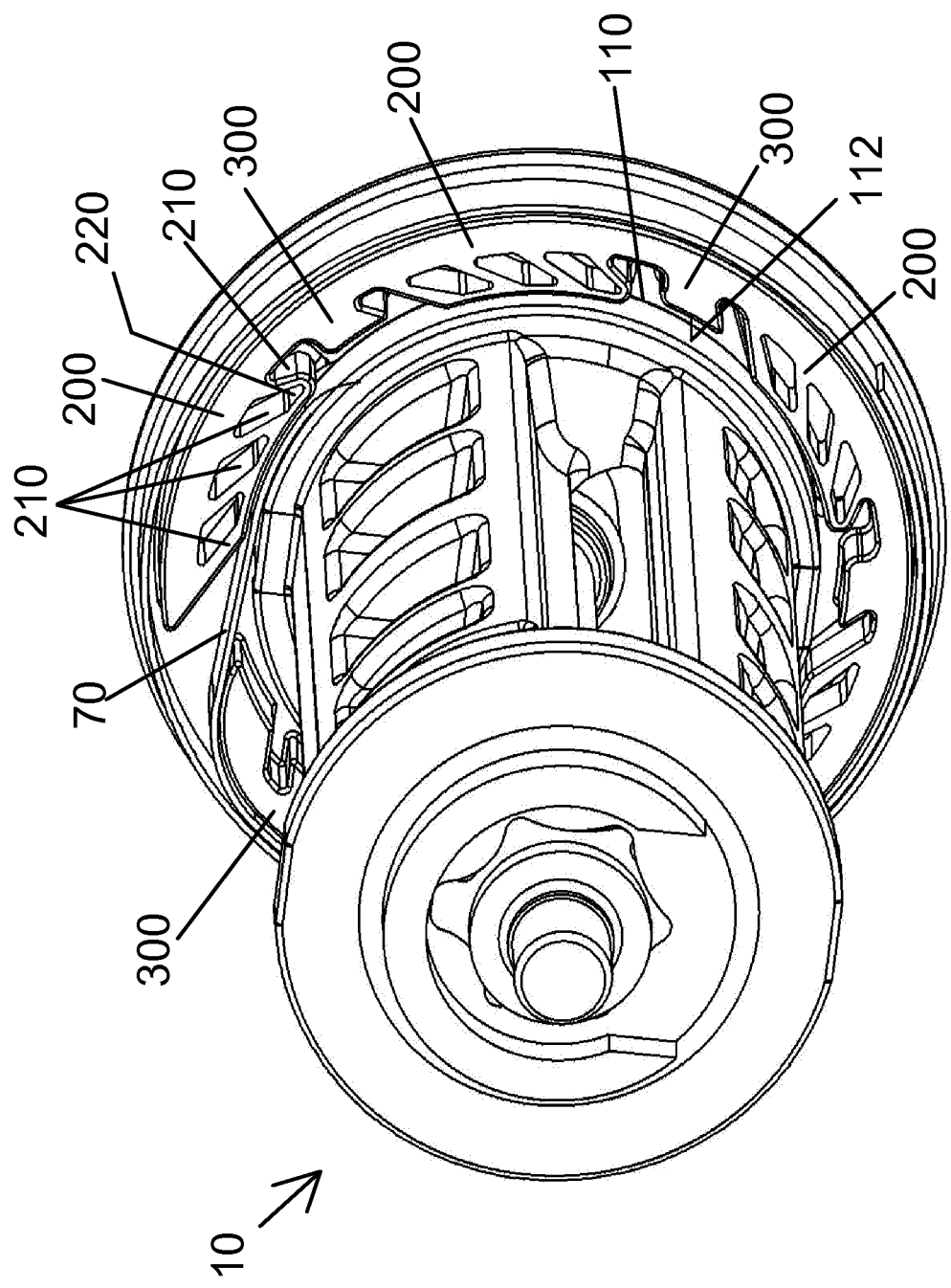
Figure 9:
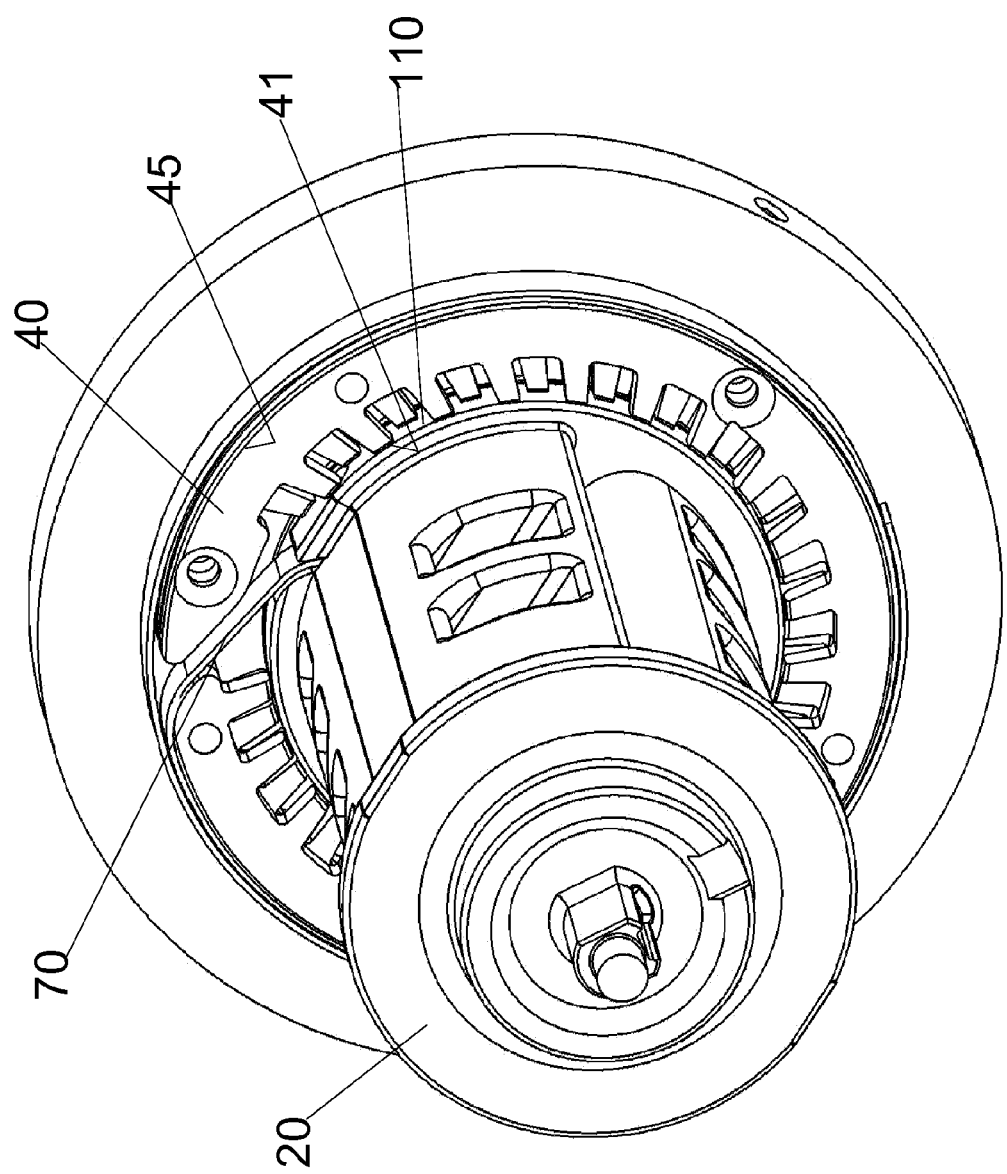
Figure 10:
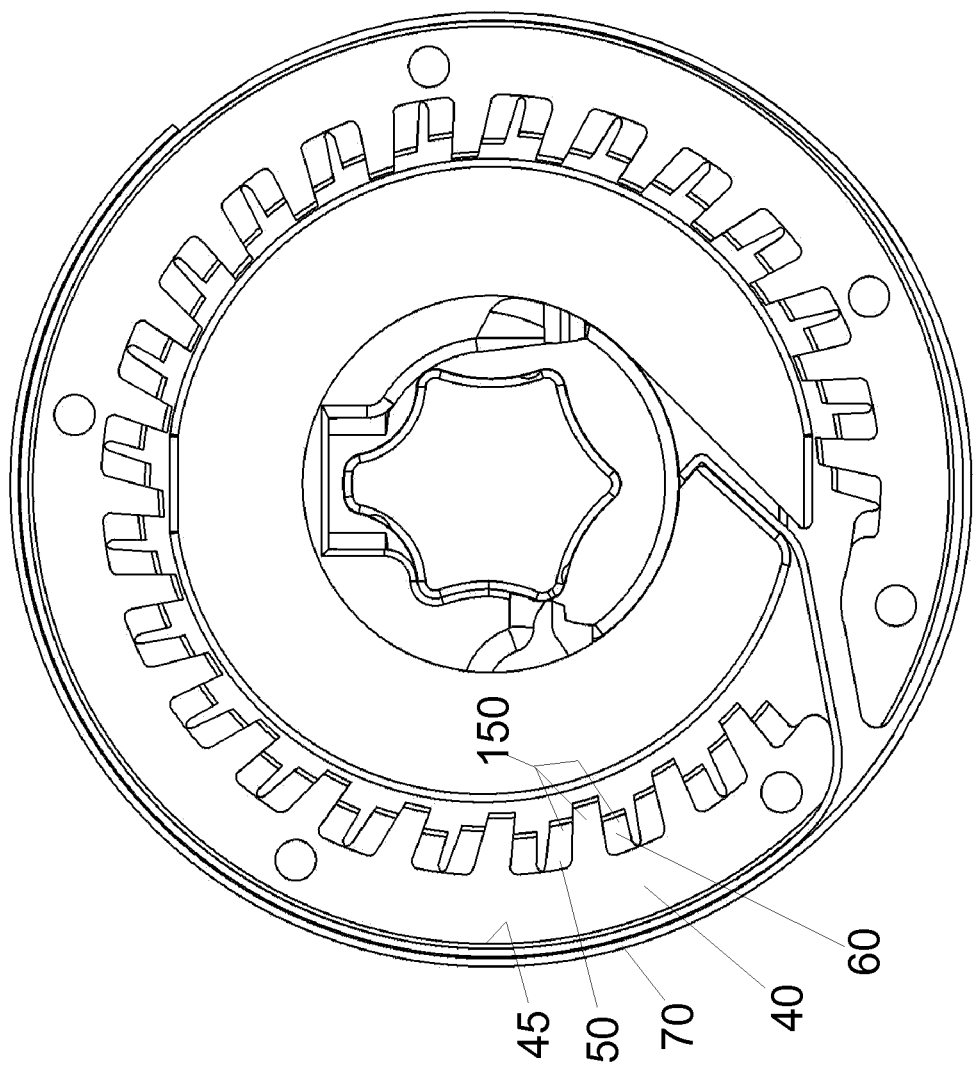
Figure 11:
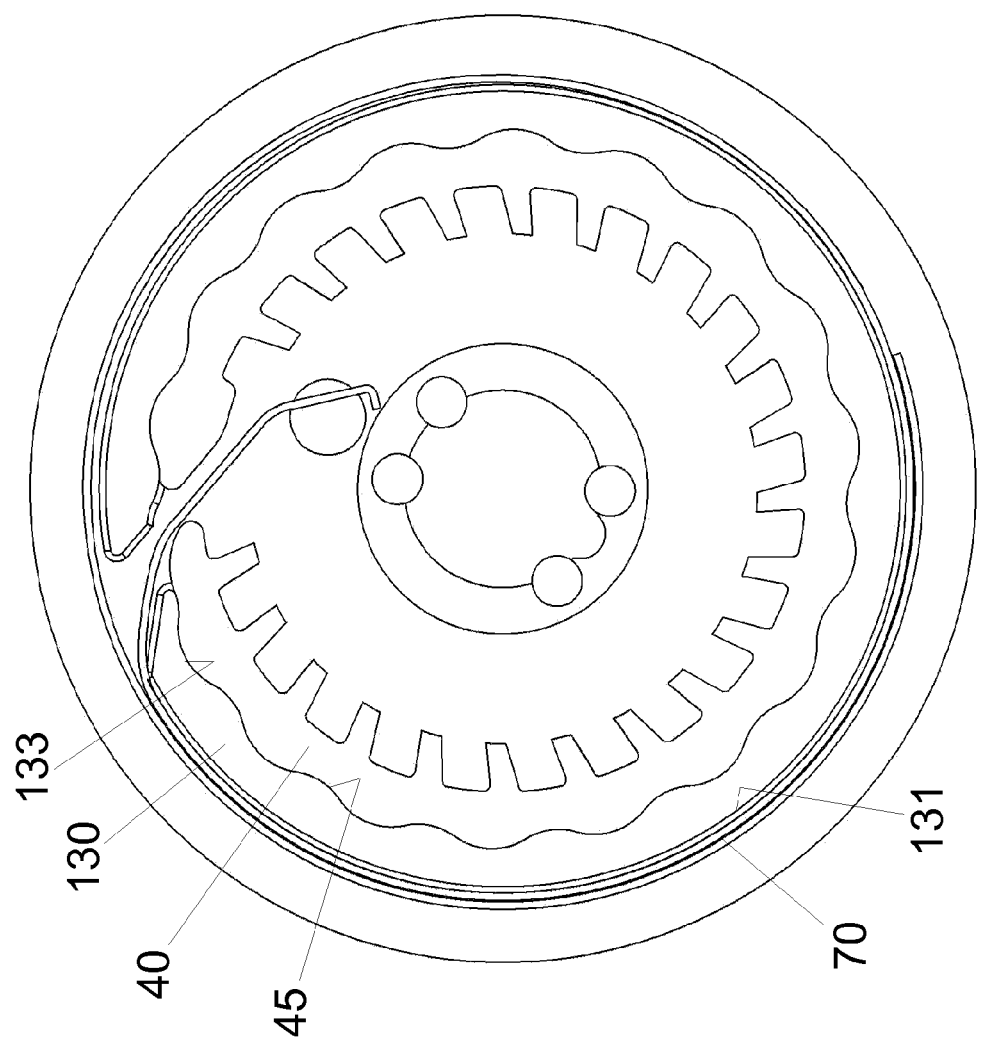
Figure 12:
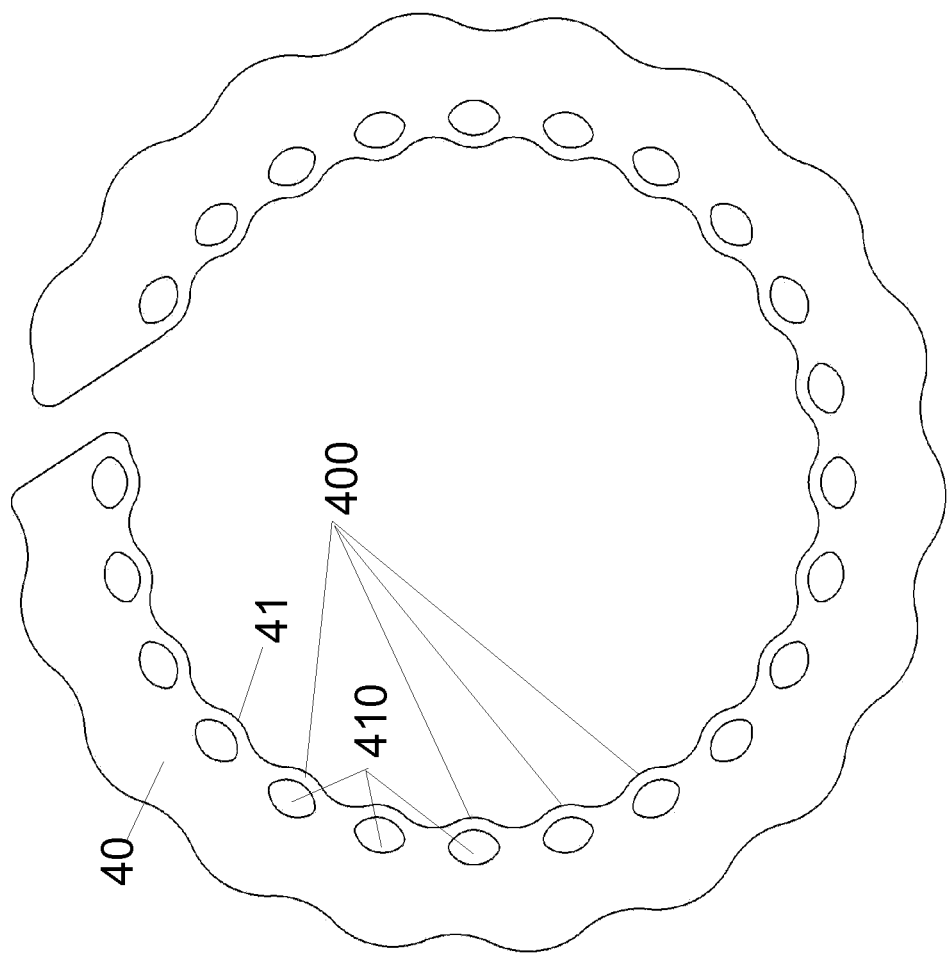
Figure 13:
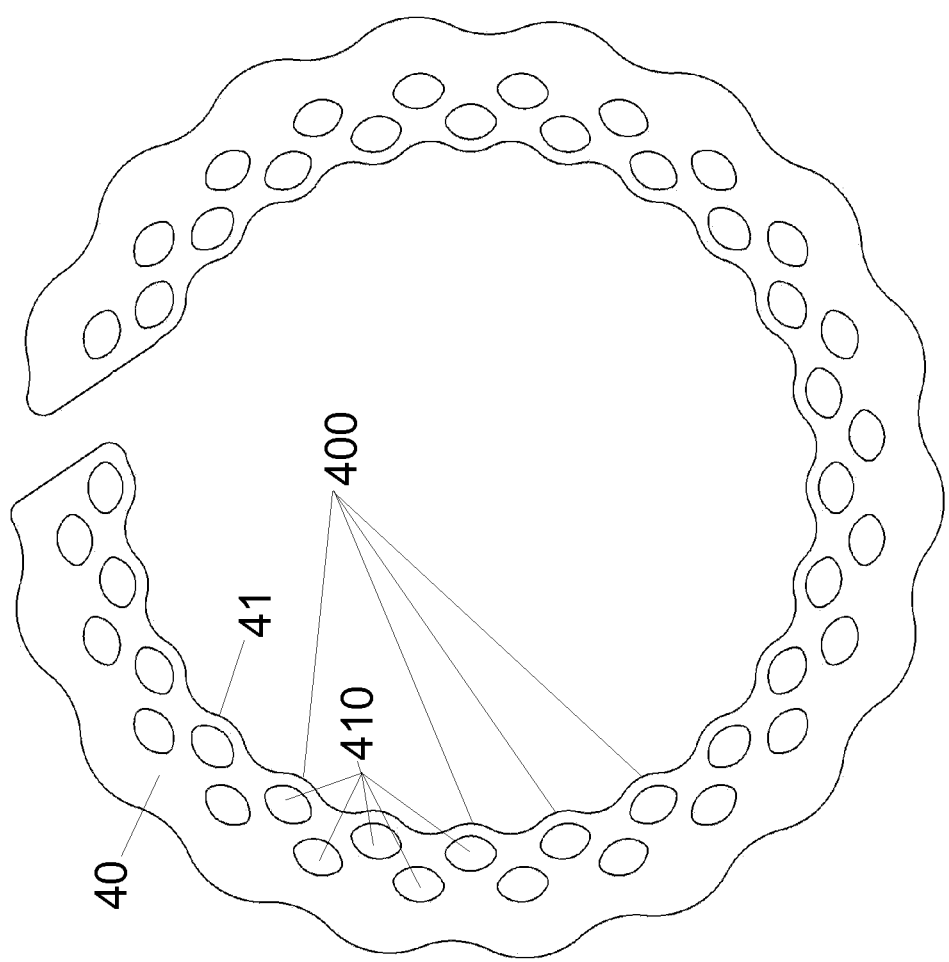
Figure 14:
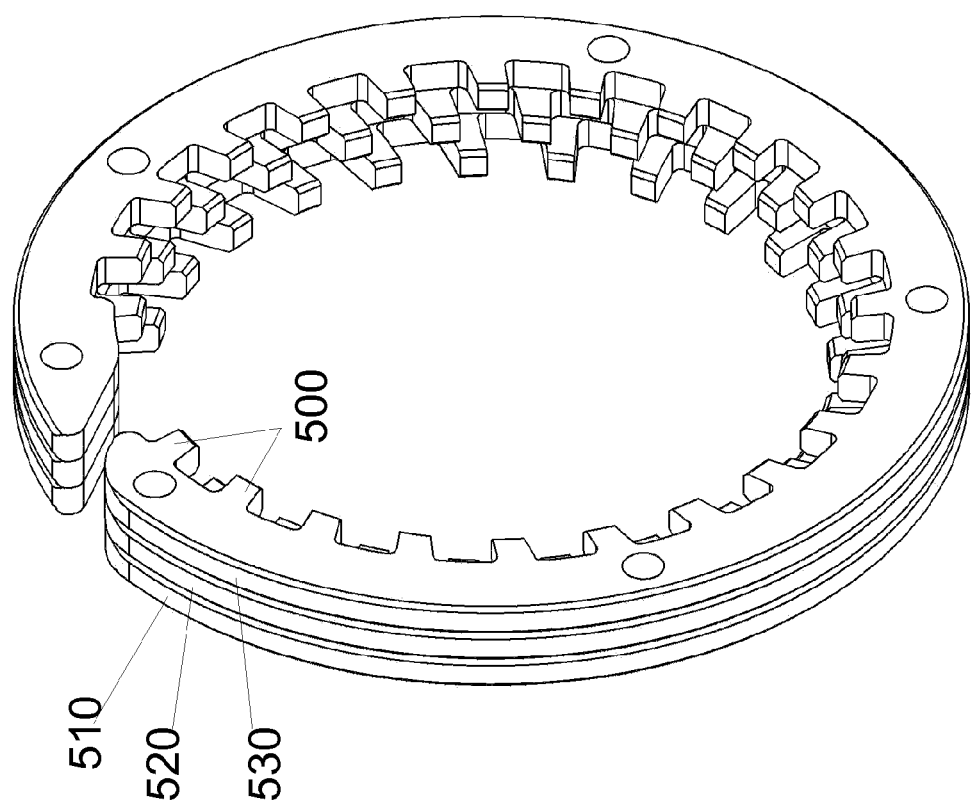
Figure 15:
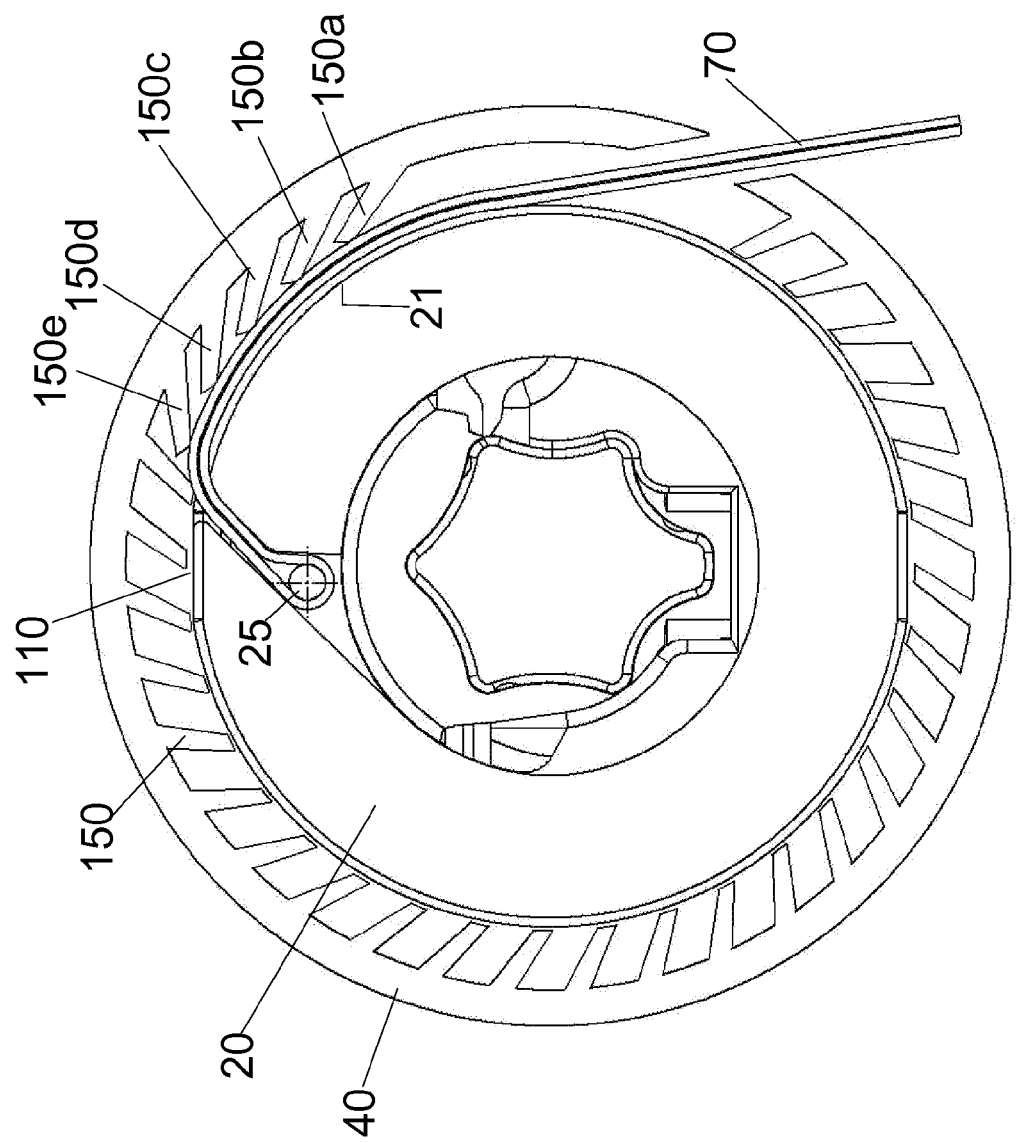
Figure 16:
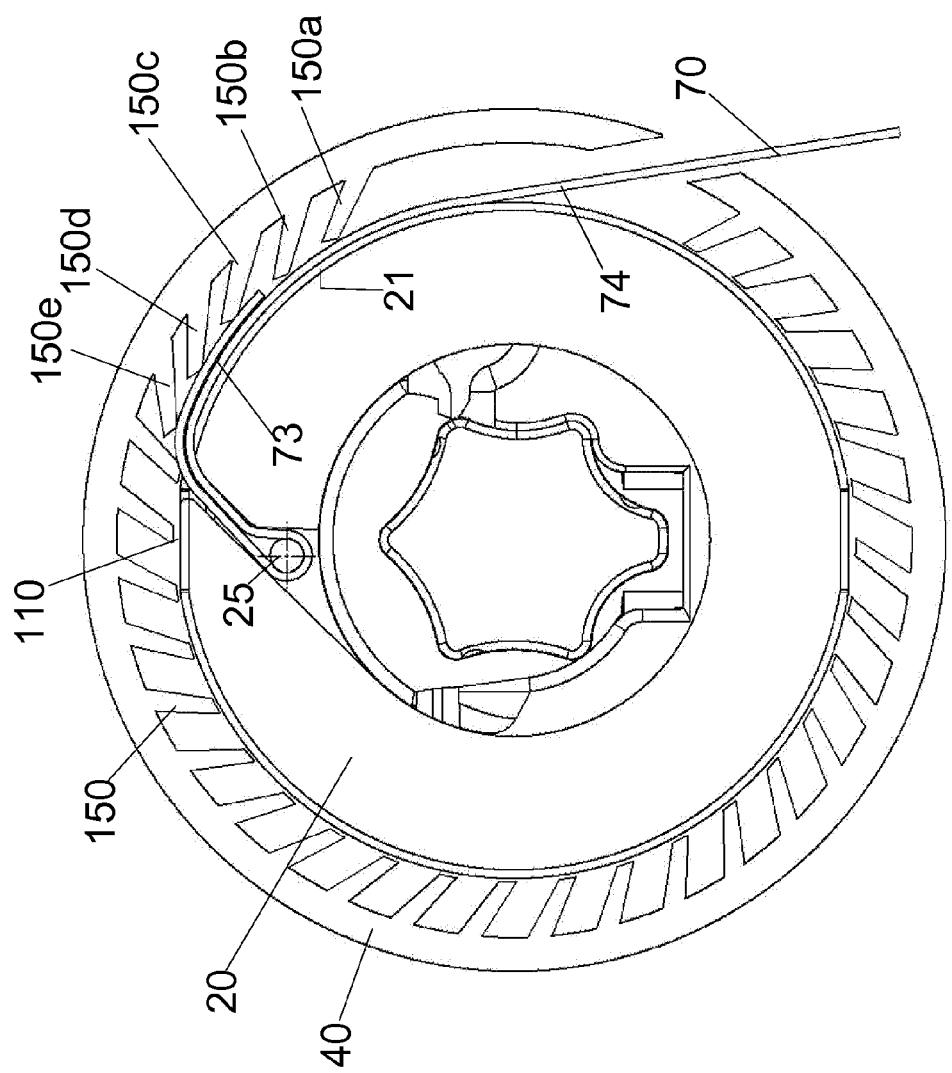

The invention is explained in more detail below with reference to exemplary embodiments; by way of example here FIG. 1 shows components of a first exemplary embodiment for a belt retractor according to the invention in an exploded illustration, FIG. 2 shows the components according to FIG. 1 in the partially mounted state, FIG. 3 shows some of the components according to FIG. 1 in the pre-mounted state, FIG. 4 shows the components according to FIG. 1 in a three-dimensional view from the side in the cut-open state, FIG. 5 shows the operation of the belt retractor according to FIG. 1 in a cross section in the starting state, i.e. before a relative rotation between belt reel and locking base, FIG. 6 shows the belt retractor according to FIG. 1 after the belt reel has been rotated by approximately 360° about the locked locking base, FIG. 7 shows the belt retractor according to FIG. 1 after the belt reel has revolved twice relative to the locking base, FIG. 8 shows components of a second exemplary embodiment for a belt retractor according to the invention, in which deformable elements are formed by supporting members with a connecting section, FIG. 9 shows components of a third exemplary embodiment for a belt retractor according to the invention, in which a band rests on the outer contour or outer side of one or more annular disks and is drawn from said outer side into a gap located between the inner side of the annular disk(s) and the locking base, FIG. 10 shows the exemplary embodiment according to FIG. 9 in a different illustration, FIG. 11 shows components of a fourth exemplary embodiment for a belt retractor according to the invention, in which one or more annular disks are held by an interlocking connection in a supporting ring fitted or integrally formed on the locking base, and a band is drawn from the outer contour or outer side of the separating ring into a gap located between the inner side of the annular disk(s) and the locking base, FIG. 12 shows an exemplary embodiment for the configuration of deformable elements on the inner contour of inner rings, wherein the deformability of the deformable elements is brought about by "hidden" holes or bores, FIG. 13 shows a further exemplary embodiment for the configuration of deformable elements on the inner contour of inner rings, wherein the deformability of the deformable elements is brought about by holes or bores which are hidden or are located therebehind at a different radial distance, FIG. 14 shows, by way of example in a different illustration, an offset of the angle of rotation between deformable elements of adjacent annular disks, FIG. 15 shows components of a fifth exemplary embodiment for a belt retractor according to the invention, in which a band is drawn in double-layered form into a gap between belt reel and locking base, and FIG. 16 shows components of a sixth exemplary embodiment for a belt retractor according to the invention, in which a band is drawn into a gap between belt reel and locking base in double-layered form in the region of a front band section and otherwise in single-layered form.

For the sake of clarity, the same reference signs are always used for identical or comparable components.

FIG. 1 shows components of a belt retractor 10 which has a belt reel 20 and a locking base 30. Three annular disks 40, 50 and 60, a band 70, a separating disk 80, a torsion bar 90 and an outer housing ring 100 are also seen in FIG. 1.

After installation of the components shown in FIG. 1, an annular gap 110 is formed between an annular outer section 21 of the belt reel 20 and the annular inner walls 41, 51 and 61 of the three annular disks 40, 50 and 60. In other words, the annular outer section 21 of the belt reel 20 forms the inner annular gap wall 111 of the annular gap 110 and the three annular inner walls 41, 51 and 61 of the three annular disks 40, 50 and 60 form an outer annular gap wall 112 of the annular gap 110.

Furthermore, after installation of the components shown in FIG. 1, an annular storage gap 120 is formed, said storage gap being bounded by an outer wall 131 of a separating ring 130 which is fitted or integrally formed on the locking base 30, and by the housing ring 100.

The annular storage gap 120 contains the band 70 which is guided at its band end 71 through a slot 132 in the separating ring 130, through slots 42, 52 and 62 in the three annular disks 40, 50 and 60 and a slot 22 in the belt reel 20 and is hooked in the interior of the belt reel 20.

FIG. 1 furthermore shows bolts 140 which permit a plug-in connection between the three annular disks 40, 50 and 60 and the locking base 30. By means of said plug-in connection and by means of the bolts 140, the three annular disks 40, 50 and 60 are connected to the locking base 30 for rotation therewith. Alternatively, a rotationally fixed connection between the locking base 30 and the annular disks 40, 50 and 60 can be brought about by an interlocking connection; such a configuration is explained furthermore in conjunction with FIG. 11.

In addition, FIG. 1 reveals that the annular inner walls 41, 51 and 61 of the three annular disks 40, 50 and 60 are in each case provided with teeth 150 which are oriented radially inward and—as will be explained in more detail further below—form deformable elements for the annular gap 110 when the band 70 is drawn from the annular storage gap 120 into the gap 110. The gap 110 is therefore a "deformable" gap.

FIG. 2 shows the components of the belt retractor 10 according to FIG. 1 in a pre-mounted state. It is seen that the annular disks are attached to the locking base 30 by means of the bolts and that the band end 71 of the band 70 is plugged through the slot in the separating ring 130 of the locking base 30 and through the slots in the annular disks. The band end 71 has an angled section 72 with which the band 70 is hooked into the belt reel 20.

Furthermore, FIG. 2 very readily reveals the formation of the annular storage gap 120 which is bounded by the locking base 30, the separating ring 130 of the locking base 30 and the housing ring 100. The annular storage gap 120 contains the band 70, with the exception of the band end 71 which is plugged through the slots and is hooked into the belt reel 20.

FIG. 3 shows the components of the belt retractor 10 according to FIG. 1 in the fully mounted state. The band 70 and the band end 71 which is hooked into the belt reel 20 are seen. Furthermore, it can be seen that the teeth 150 which are arranged on the annular inner walls of the three annular disks are offset with respect to one another. Said offset is based on a rotated arrangement of the teeth 150 relative to one another on the annular disks 40, 50 and 60. Owing to said offset, the belt band 70, when the latter is drawn into the annular gap 110, will run in a time-staggered manner against the teeth 150 of the three annular disks such that a very continuous force profile is ensured over the relative angle of rotation between locking base 30 and belt reel 20.

FIG. 4 shows the components of the belt retractor 10 according to FIG. 1 in the fitted state, wherein the belt reel 20 is illustrated cut open. It can be seen in the illustration according to FIG. 4 that the angled section 72 of the band 70 is hooked into the belt reel 20, and therefore, in the event of a relative rotation between the belt reel 20 and the locking base 30, the band is drawn into the annular gap 110 between the three annular disks and the annular outer section 21 of the belt reel 20.

Furthermore, FIG. 4 shows the mounted torsion bar 90 which, in the event of a relative rotation between the locking base 30 and the belt reel 20, produces a further belt restraining force which occurs in addition to the belt restraining force which is caused by the band 70. Although both the torsion bar 90 and the band 70 have the same function, namely of producing a belt restraining force in the event of a relative rotation between locking base 30 and belt reel 20, said two components operate separately from each other, and therefore the belt restraining force can be set by means of said two components independently of each other. The torsion bar may also be dispensed with if a sufficient belt restraining force is produced by the band 70 by itself.

In conjunction with FIGS. 5, 6 and 7, the operation of the band 70 in the belt retractor 10 according to FIGS. 1 to 4 is explained in more detail. FIG. 5 illustrates a cross section through the belt retractor 10 in a sectional plane in which the annular disk 40 according to FIG. 1 is located.

It can be seen in FIG. 5 that the band end 71 of the band 70 is guided through the slot 42 in the annular disk 40 and is hooked into the belt reel 20. The annular storage gap which is arranged concentrically with respect to the annular gap 110 and surrounds the latter radially on the outside is not illustrated specifically in FIG. 5 for reasons of clarity.

If, in the event of blocking of the locking base, a relative rotation between the belt reel 20 and the locking base then occurs, the band end 71, and therefore the band 70 as a whole, is drawn into the annular gap 110 between the annular outer section 21 of the belt reel 20 and the annular inner wall 41 of the annular disk 40. The teeth 150 which are formed on the annular inner wall 41 of the annular disk 40 are dimensioned in such a manner that the distance between the tooth tip 151 and the annular outer section 21 of the belt reel 20 is smaller than the thickness d of the band 70. This results in deformation of said tooth occurring when the band 70 runs against the first tooth 150a in FIG. 5 and in deformation energy being consumed. In a corresponding manner, the further teeth 150b, 150c, 150d etc. are deformed when, during a relative rotation of the belt reel 20 along the direction of rotation P, the band 70 runs against said teeth.

FIG. 6 shows the situation after the belt reel 20 has been rotated by 360° relative to the locking base. It can be seen that the tooth tips 151 of the teeth 150 arranged on the annular inner wall of the annular disk have been deformed, since the original distance between the tooth tips 151 and the annular outer section 21 of the belt reel 20 was smaller than the thickness of the band 70. In a corresponding manner, a further deformation and a further bending away of the tooth tips 151 of the teeth 150 on the annular inner wall of the annular disk 40 occur when the band 70 is rotated further into the annular gap.

FIG. 7 shows the situation after two revolutions of the belt reel 20 relative to the locking base. It can be seen that the gap width b—as seen in the radial direction—of the annular gap 110 has increased by the band 70 being drawn in and wound up on the annular section 21 of the belt reel 20, wherein the increase in the gap width b is based on a deformation of the teeth 150 which operate as deformable elements.

In summary, it can be determined that, in the exemplary embodiment according to FIGS. 1 to 7, there is an annular gap 110 which is bounded on the outer side by deformable elements in the form of inwardly projecting teeth 150, and therefore, during a relative rotation between the belt reel 20 and the locking base 30 and when the band 70 is drawn into the annular gap 110, a deformation of the teeth 150 occurs, as a result of which a belt restraining force is brought about.

The material of the band 70 is preferably stainless steel or spring steel, the strength value Rm of which is at least 1400 $N/mm^2$.

FIG. 8 shows components of a second exemplary embodiment for a belt retractor 10 according to the invention. In this exemplary embodiment, the annular disks, the annular inner walls of which form the outer annular gap wall 112 of the annular gap 110, are not provided with teeth, as is the case in the exemplary embodiment according to FIGS. 1 to 7. Instead, the deformable elements are formed by deformation members 200 which are similar to a bridge structure and in each case have four supporting members 210. The four supporting members 210 are connected to one another by a connecting section 220. The connecting section 220 is preferably in the shape of a circular arc.

As can be seen in FIG. 8, there is preferably a plurality of deformation members 200 which are arranged in a rotationally symmetrical manner. The deformation members 200 can be arranged directly adjacent to one another or—as shown by way of example in FIG. 8—can be separated by separating sections 300.

The above statements apply correspondingly to the operation of the belt retractor 10 according to FIG. 8. The thickness of the band 70 is preferably greater than the gap width—as viewed in the radial direction—of the annular gap 110, and therefore, when the band 70 is rotated into the annular gap 110, the deformable elements or the deformation members 200 are deformed and deformation energy is produced which, in turn, leads to a belt restraining force in the event of a relative rotation between belt reel 20 and locking base 30. Alternatively, the gap width—as viewed in the radial direction—of the annular gap 110 can also be greater than the thickness of the band 70, and therefore the deformation members 200 are bent only after one or more revolutions of the belt reel.

FIG. 9 shows components of a third exemplary embodiment for a belt retractor. In this exemplary embodiment, the band 70 rests on the outer contour or outer side 45 of the annular disk 40 and on the outer contour or outer side of the remaining annular disks 50 and 60 and is drawn from said outer side 45 into a gap 110 located between the annular inner wall 41 of the annular disk 40 and the locking base 20. In this exemplary embodiment, the annular disks are fastened to the locking base 20 preferably by means of screws or bolts.

FIG. 10 shows the exemplary embodiment according to FIG. 9 once again in a different illustration in which, in addition to the annular disk 40, the annular disks 50 and 60 and the rotational offset of the teeth 150 are also seen. It can also be seen that the band 70 rests on the outer side 45 of the annular disk 40 and is drawn from there into the gap.

FIG. 11 shows components of a fourth exemplary embodiment for a belt retractor. In this exemplary embodiment, the annular disk 40 is held by an interlocking connection in a separating ring 130 which is preferably formed integrally on the locking base. The interlocking connection is based on an undulating inner contour 133 of the separating ring 130 and an undulating outer contour or outer side 45 of the inner ring 40. Of course, the separating ring 130 can hold further inner rings, if such are present, in an interlocking manner in the same way. In this configuration, screws or bolts for fixing the inner ring 40 can be dispensed with.

In the exemplary embodiment according to FIG. 11, the band 70 bears against the outer wall 131 of the separating ring 130 and is drawn from there into the gap (not illustrated specifically) between the annular inner wall of the annular disk 40 and the locking base.

FIG. 12 shows another exemplary embodiment for the configuration of deformable elements 400 on the inner contour of inner rings. An inner ring 40 is seen, on the annular inner wall 41 of which arcuate projections are present instead of teeth, said projections being weakened by holes 410 or bores arranged radially on the outside or radially behind the annular inner wall 41, and therefore, when a band is drawn in, the arcuate projections can be bent outward. The deformability of the deformable elements is therefore brought about by holes or bores which lie therebehind or are hidden.

FIG. 13 shows a further exemplary embodiment for the configuration of deformable elements 400 on the inner contour of an inner ring 40, wherein the deformability of the deformable elements 400 is brought about by holes or bores 410 which lie therebehind and are at a different radial distance. Otherwise, the exemplary embodiment according to FIG. 13 corresponds to the exemplary embodiment according to FIG. 12.

In the exemplary embodiments according to FIGS. 12 and 13, the inner ring 40 has an undulating outer contour or outer side, and therefore an interlocking connection to the locking base, for example to a separating ring of the locking base, is possible. Of course, a different type of connection to the locking base can also take place, for example by means of screws, bolts or the like.

FIG. 14 shows, by way of example, in a further illustration, an angle of rotation offset between deformable elements 500 of adjacent annular disks 510, 520 and 530. A rotated arrangement of the deformable elements 500 with respect to one another makes it possible in a particularly simple manner to achieve a continuous profile of the belt band extension force over the relative angle of rotation between locking base and belt reel since sudden drops in force in the sections between successive deformable elements of an annular disk can be compensated for by offset deformable elements of another annular disk.

There are various possibilities regarding the rolled-up state of the band 70 in the mounted belt retractor which is ready for use, which possibilities will be outlined in brief here by way of example:

1. Only the band end 71 is hooked into the belt reel, the remaining band material remains outside the gap and only during the subsequent use of the belt retractor is drawn into the gap in the event of a, for example, accident-induced relative rotation between belt reel and locking base.

2. A section of the band 70 is already drawn into the gap or inserted into the gap during the installation of the belt retractor, and therefore the hooking-in point of the band end 71 into the belt reel is relieved of load mechanically. For example, the ready mounted state can appear as is shown in FIGS. 5 and 6.

3. The belt reel is already rotated relative to the locking base during the installation of the belt retractor, and therefore a section of the band 70 is drawn into the gap. Such a rotation can take place up to a predetermined angle of rotation or until a predetermined torque is achieved. The effect achieved in the last-mentioned variant is that, during a later use of the belt retractor in the event of a, for example, accident-induced relative rotation between belt reel and locking base, a fixedly predetermined torque is immediately available in a very precise manner. Component tolerances can thus be compensated for in a simple manner.

As can be gathered from the above statements, the production of a belt extension force is based on an expansion of the gap width of the annular gap 110 when the band 70 deforms the deformable elements which are provided on the gap-wall side. Depending on the material of the deformable elements, the gap width of the annular gap 110 and the thickness of the band 70, different manners of operating the belt retractor can be realized: for example, it is possible to end the relative rotation between the belt reel 20 and the locking base 30 when the band 70 has been completely drawn into the annular gap 110; this is possible, for example, by means of a stopping element at the other band end of the band 70. Alternatively, stopping of the relative rotation between locking base and belt reel can be achieved by a further rotation being suppressed from a predetermined angle of rotation by the fact that the deformable elements prevent a further increase in the gap width and the belt reel 20 is stopped by the band 70 which is clamped in the annular gap 110. It is also possible to allow the band 70 to be completely drawn into the annular gap 110 and to bring about an ending of the relative rotation of the belt reel 20 by components other than the belt band 70.

FIG. 15 shows components of a fifth exemplary embodiment for a belt retractor. In this exemplary embodiment, the band is hooked into the belt reel 20 in double-layered form at a hooking-in point 25 and is drawn in double-layered form into the gap 110 between the inner ring 40, which is connected to the locking base for rotation therewith, and the outer section 21 of the belt reel 20. Owing to the double-layered structure of the band 70, the belt restraining force is significantly greater than in the case of a single-layered drawing-in of the belt (cf. "single-layered" exemplary embodiments according to FIGS. 1 to 14) because the teeth 150 have to be deformed to a significantly greater extent and, accordingly, the belt band extension is opposed by a greater deformation force than in the case of a single-layered drawing-in of the band. Moreover, because of the possibly occurring elastic restoring force of the teeth 150, a greater frictional force than in the case of a single-layered drawing-in of the band subsequently occurs.

FIG. 16 shows components of a sixth exemplary embodiment for a belt retractor. In this exemplary embodiment, the band 70 is hooked into the belt reel 20 in double-layered form at a hooking-in point 25 and is drawn into the gap 110 between belt reel 20 and locking base in double-layered form with a front double-layered band section 73. However, in contrast to the exemplary embodiment according to FIG. 15, the band 70 is not drawn in permanently in double-layered form, but rather only with the front double-layered band section 73. The front double-layered band section 73, which is hooked into the belt reel 20, is adjoined by a rear single-layered band section 74 which is drawn in single-layered form and results in a single-layered drawing-in of the band.

Owing to the double-layered drawing-in of the band, the teeth 150 are essentially deformed in each case only by the double-layered section 73, but not by the subsequent single-layered section 74. Even if, because of a certain elasticity of the teeth (cf. teeth 150a and 150b in FIG. 16), a certain springing back of the teeth 150a and 150b in the direction of the gap 110 occurs after the double-layered band section 73 has passed through, the contact pressure force of the teeth 150a and 150b will be relatively small—at least significantly smaller than the contact pressure force of the teeth 150c, 150d and 150e acting on the double-layered band section 73, and therefore the frictional force which is caused by the teeth 150a and 150b acting on the single-layered band section 74 is significantly lower if not even negligibly small. If the teeth 150 have only little elasticity, if any at all, then the single-layered drawing-in of the band can also take place without contact with the teeth 150 and without friction, since the teeth 150 can already be sufficiently bent away by the double-layered band section 73.

The double-layered drawing-in of the band, as has been explained in conjunction with FIGS. 15 and 16, can be used in an identical manner in the case of deformable elements formed differently than teeth, for example in the case of the deformable elements as have been explained in conjunction with FIGS. 8, 12 and 13.

LIST OF REFERENCE SIGNS

10 Belt retractor
20 Belt reel
21 Outer section
22 Slot
25 Hooking-in point
30 Locking base
40 Annular disk
41 Annular inner wall
42 Slot
45 Outer side
50 Annular disk
51 Annular inner wall
52 Slot
60 Annular disk
61 Annular inner wall
62 Slot
70 Band
71 Band end
72 Section
73 Front double-layered band section
74 Rear single-layered band section
80 Separating disk
90 Torsion bar
100 Housing ring
110 Gap
111 Inner annular gap wall
112 Outer annular gap wall
120 Storage gap
130 Separating ring
131 Outer wall
132 Slot
133 Inner contour
140 Bolt
150 Tooth
150a Tooth
150b Tooth
150c Tooth
150d Tooth
151 Tooth tip
200 Deformation member
210 Supporting member
220 Connecting section
300 Separating section
400 Deformable element
410 Hole
500 Deformable element
510 Annular disk
520 Annular disk
530 Annular disk
b Gap width
d Thickness
P Direction of rotation

The invention claimed is:

1. A belt retractor for a seatbelt, with
a belt reel for winding and unwinding the seatbelt, and
a lockable locking base which is connected to the belt reel and, before locking,
is rotated together with the belt reel and, after locking, is blocked in its rotational movement,
wherein, in the event of locking of the locking base for the purpose of limiting the belt force, a relative rotation between locking base and belt reel is possible, wherein the belt retractor has a band which, in the event of a relative rotation between the belt reel and the locking base, is drawn into a gap, and
the edge of the gap is bounded by at least one deformable element which is deformed by the band being drawn into the gap.

2. The belt retractor as claimed in claim 1, wherein the gap is annular and is bounded by an outer annular gap wall and an inner annular gap wall.

3. The belt retractor as claimed in claim 2, wherein the at least one deformable element is formed on the outer annular gap wall or on the inner annular gap wall and, in the event of a deformation of the at least one deformable element, the gap width (b) of the annular gap is increased in the radial direction.

4. The belt retractor as claimed in claim 3, wherein the outer gap wall of the gap is formed by annular inner walls of at least two annular disks which are arranged one behind another in the direction of the belt reel axis, and wherein each of the two annular disks include a plurality of inwardly projecting deformable elements.

5. The belt retractor as claimed in claim 4, wherein the inwardly projecting, deformable elements of the at least two annular disks are configured to rotate relative to one another in such a manner so that when the band is introduced into the gap, the band contacts the deformable elements of one of the annular disks before the band contacts the deformable elements of the other one of the annular disks.

6. The belt retractor as claimed in claim 3, wherein the outer gap wall of the gap is formed by annular inner walls of at least three annular disks which are arranged one behind another in the direction of the belt reel axis, and wherein each of the at least three annular disks include a plurality of inwardly projecting, deformable elements, wherein the inwardly projecting, deformable elements of the annular disks are configured to rotate with respect to one another so that when the band is introduced into the gap the band makes contact with the deformable elements of each of the three annular disks sequentially.

7. The belt retractor as claimed in claim 4, wherein the annular disks are cast or punched parts which are attached to the locking base for rotation therewith.

8. The belt retractor as claimed in claim 1, wherein the gap is bounded on one side by the locking base and wherein the gap is bounded on the other side by the belt reel.

9. The belt retractor as claimed in claim 1, wherein the inner annular gap wall is formed by an annular outer section of the belt reel.

10. The belt retractor as claimed in claim 1, wherein the gap and the annular gap walls are arranged concentrically with respect to the axis of the belt retractor.

11. The belt retractor as claimed in claim 1 wherein the band is connected at one end to the belt reel.

12. The belt retractor as claimed in claim 1 wherein the belt retractor has an annular storage gap in which the band is stored in wound-up form before a relative rotation between belt reel and locking base and in the event of a relative rotation between locking base and belt retractor, the band is drawn into the gap by the at least one deformable element.

13. The belt retractor as claimed in claim 12, wherein the annular storage gap and the gap are arranged concentrically with respect to each other.

14. The belt retractor as claimed in claim 1, wherein
at least one of the deformable elements is formed by a tooth or projection which is oriented in the direction of the interior of the gap, and/or
at least one of the deformable elements comprises at least two supporting members which are connected to each other by a connecting section which forms an arcuate section of the outer annular gap wall or of the inner annular gap wall.

15. A method for mounting a belt retractor as claimed in claim 1, comprising the steps of: rotating the belt reel relative to the locking base so that the band is drawn into the gap, wherein the belt reel is rotated until the torque required for the rotation has reached a predetermined value.

\* \* \* \* \*